(12) United States Patent
Peng

(10) Patent No.: US 7,032,920 B1
(45) Date of Patent: Apr. 25, 2006

(54) EMBELLISHED VEHICLE TRAILER HITCH-BALL ASSEMBLY

(76) Inventor: Vincent Peng, 322 S. Ynez Ave., #C, Monterey Park, CA (US) 91754

( * ) Notice: Subject to any disclaimer, the term of this patent is extended or adjusted under 35 U.S.C. 154(b) by 0 days.

(21) Appl. No.: 11/052,733

(22) Filed: Jan. 31, 2005

Related U.S. Application Data

(60) Provisional application No. 60/542,435, filed on Feb. 9, 2004.

(51) Int. Cl.
*B60D 1/06* (2006.01)
*B60Q 1/26* (2006.01)

(52) U.S. Cl. .................. 280/511; 362/540; 362/545
(58) Field of Classification Search ............. 280/511; 362/545, 459, 488, 540, 541
See application file for complete search history.

(56) References Cited

U.S. PATENT DOCUMENTS

| | | | |
|---|---|---|---|
| 4,319,766 A * | 3/1982 | Corteg et al. ............... 280/511 |
| 6,053,521 A * | 4/2000 | Schertler ..................... 280/511 |
| 6,079,136 A * | 6/2000 | Kozlarek ..................... 40/541 |
| 6,102,424 A * | 8/2000 | Cole et al. .................. 280/507 |
| 2005/0194761 A1* | 9/2005 | Givens ........................ 280/477 |

\* cited by examiner

*Primary Examiner*—Kevin Hurley
(74) *Attorney, Agent, or Firm*—Albert O. Cota

(57) ABSTRACT

An embellished vehicle trailer hitch-ball assembly (10) that is comprised of an upper ball receptor (12) having an upper surface (14) and a lower surface (16) that is integrally molded to a frame attachment platform (18) from where extends a threaded mounting rod (20). The mounting rod (20) is inserted into a frame bore (28) located on a rear vehicle frame (26) and tightened by a mounting nut (22). On the upper surface (14) of the upper ball receptor (12) is located an embellishment element consisting of at least one LED that is illuminated by a source of electrical power supplied by a vehicle electrical circuit (44). The power applied to the at least one LED is controlled by either a manually operated power switch (64) or when the vehicle's brake pedal is depressed.

13 Claims, 7 Drawing Sheets

EMBELLISHED VEHICLE TRAILER HITCH-BALL ASSEMBLY

This application claims priority of Provisional Patent Application No. 60/542,435 filed Feb. 9, 2004.

TECHNICAL FIELD

The invention pertains to the general field of vehicle accessories, and more particularly to vehicle trailer hitch-ball assembly that is embellished with LEDs and/or a mast that includes a display.

BACKGROUND ART

The use of accessories to enhance and to personalize a vehicle is a popular past-time. The after-market vehicle accessory business includes a myriad of items that can be added to a vehicle, or items that are replaced with more functional and/or personalized items. The instant invention is designed to replace an existing or to add a new vehicle trailer hitch-ball structure that is embellished with at least one Light Emitting Diode (LED). The at least one LED can be illuminated by a manually operated switch or be operated automatically when the vehicle brake pedal is depressed. In lieu of an LED, the inventive structure can be designed with a passive mast that has a flag, a pennant, a banner or a placard attached thereto.

A search of the prior art did not disclose any patents that read directly on the claims of the instant invention. However, the following U.S. patents are considered related:

| PATENT NO. | INVENTOR | ISSUED |
|---|---|---|
| D501,434 | Peng | 1 Feb. 2005 |
| 6,637,718 | Wilson | 28 Oct. 2003 |
| D438,828 | Thomas | 13 Mar. 2001 |

The D501,434 patent discloses a design for an embellished vehicle trailer hitch-ball assembly. The embellishment consists of a plurality of horizontally or vertically oriented LEDs that are located on an upper ball receptor of the assembly. The inventor of this design patent is also the inventor of the instant application.

The U.S. Pat. No. 6,637,718 patent discloses a flagstaff holder that is removably attached to a vehicle by use of a standard trailer hitch coupling. The flagstaff holder is mounted at the distal end of an adjustable length vertical support, which may raised to provide flag visibility or lowered to a stowed position. Illumination means for the flag or banner is provided and a hitch ball may also be provided so that the standard trailer hitch coupling can be used without removal of the flag or the flagstaff holder.

The D438,828 patent discloses a design for a mounting stem that is attached to a vehicle rear frame member. To the upper end of the mounting stem is attached an upper trailer hitch-ball.

DISCLOSURE OF THE INVENTION

The embellished vehicle trailer hitch-ball assembly in its basic design configuration is comprised of a vehicle trailer hitch-ball structure further consisting of an upper ball receptor having an upper surface and a lower surface. The lower surface is integrally attached to a vehicle frame-attachment platform integrally followed by a threaded mounting rod. The rod in turn is inserted into a frame bore located on a rear vehicle frame and is subsequently tightened by a mounting nut.

The inventive vehicle trailer hitch-ball structure includes an embellishing means that adds functional capability and aesthetic visibility to the structure. The embellishing means is selected from a group consisting of:

a) The upper ball receptor having at least one LED that is illuminated by an electrical power source provided by a vehicle electrical circuit. The electrical power can be controlled by either a manually operated power switch or automatically when the vehicle brake pedal is depressed, or, b) The upper ball receptor having at least one mast cavity into which is inserted a passive mast having attached a flag, pennant or a placard.

In a preferred design configuration, the at least one LED is comprised of a plurality of parallel connected LEDs that are placed in a horizontal or vertical channel located around the circumference of the upper ball receptor. Power to the LEDs is provided by a cable assembly having a first end and a second end. The first end is connected to an input of the parallel-connected LEDs, the second input is connected via a series resistor to a 12-volt vehicle electrical circuit. The vehicle electrical circuit can consist of a vehicle switched voltage, a vehicle non-switched voltage or a voltage that is applied when the vehicle brake pedal is depressed.

In a second design configuration the upper ball receptor has a centered module cavity located on its upper surface and having a centered cavity bore. Into the module cavity is inserted in sequence, a first module and a second module. Through the vehicle trailer hitch-ball structure and through the first and second modules is an aligned wiring bore into which is inserted a three-section, two-wire cable. The first cable section has a lower end that is connected to the vehicle electrical circuit and an upper end that terminates at the cavity bore located on the module cavity. The second cable section has a lower end that makes contact with the upper end of the first cable section and an upper end that terminates at the upper surface of the first module. The third cable section has a lower end that makes contact with the upper end of the second cable section and an upper end that is connected to at least one LED that extends upward from the upper surface of the second module. Finally, a translucent or transparent dome is utilized. The dome has an LED cavity that fits over the at least one LED and includes means for being attached to the upper surface of the second module.

The third design configuration includes on the upper surface of the upper ball receptor at least one mast cavity. Into the mast cavity is inserted and attached a passive mast that has attached a display that consist of a flag, a pennant or a placard.

In view of the above disclosure it is the primary object of the invention to produce a vehicle trailer hitch-ball assembly that is embellished with a plurality of LEDs or a passive mast which includes a display that adds both functional and aesthetic capability to the assembly.

In addition to the primary object of the invention it is also an object of the invention to produce a vehicle trailer hitch-ball assembly that:

can be produced from various materials such as steel or plastic, can be produced in various colors, can be produced with various colors LED colors, can be used as a fourth brake light when the LEDs are red and are illuminated when the vehicle brake petal is depressed, and is cost effective from both a manufacturer's and a consumer's points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
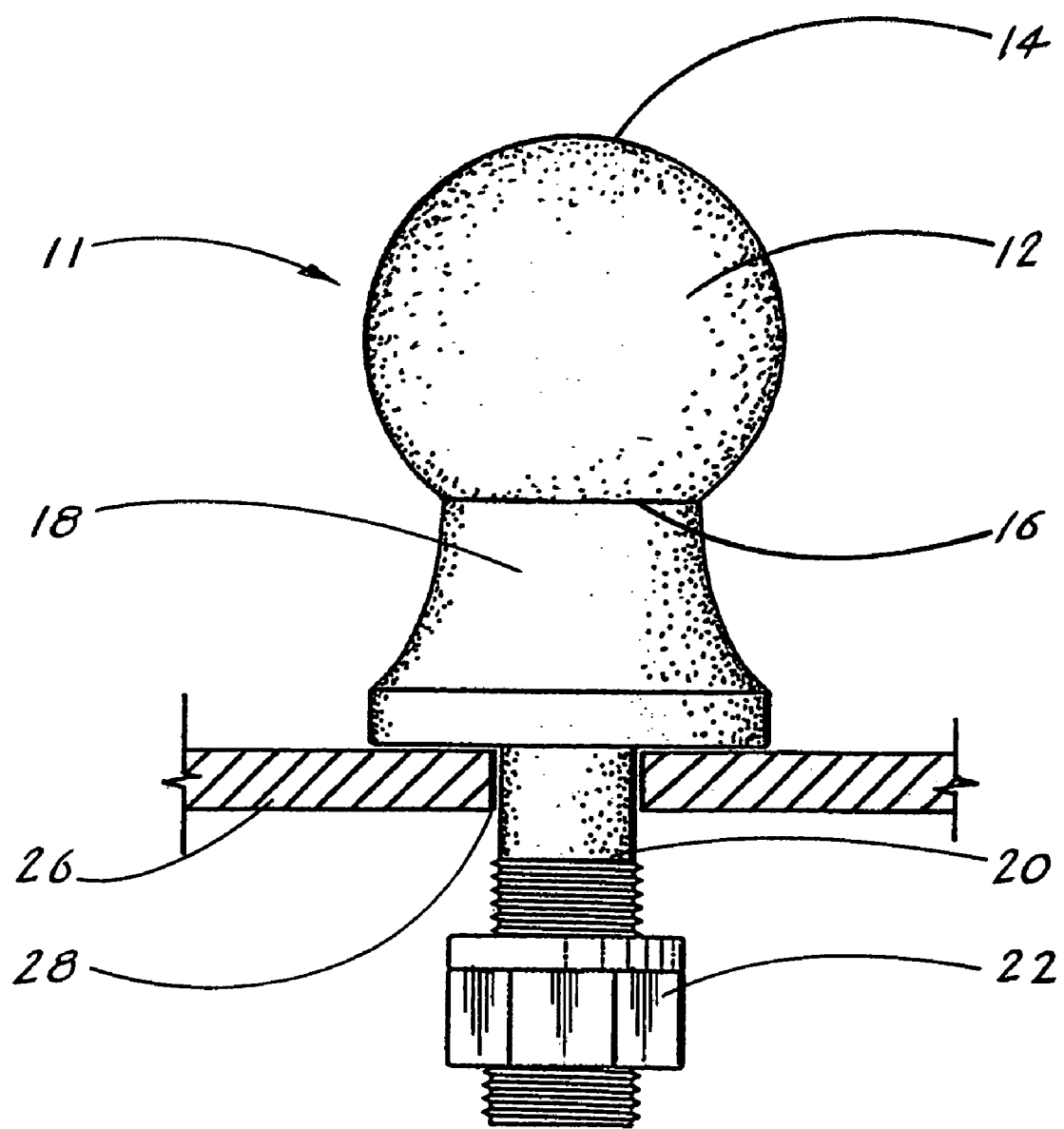
FIG. 1 is a front elevational view of a prior art vehicle trailer hitch-ball structure attached to a rear vehicle frame.

The best mode for carrying out the invention is presented in terms of a preferred embodiment for an embellished vehicle trailer hitch-ball assembly 10 that is disclosed in three design configurations. The design of a prior art vehicle trailer hitch-ball structure 11, as shown in FIG. 1, is comprised of an upper ball receptor 12 having an upper surface 14 and a lower surface 16 that is integrally molded with a frame attachment platform 18 from where extends a threaded mounting rod 20. The prior art vehicle trailer hitch-ball structure 11 is shown in FIG. 1, with the threaded mounting rod 20 inserted through a frame bore 28 that is located on a rear vehicle frame 26. The vehicle trailer hitch-ball structure is tightened against the frame 26 by means of a mounting nut 22.

Figure 2:
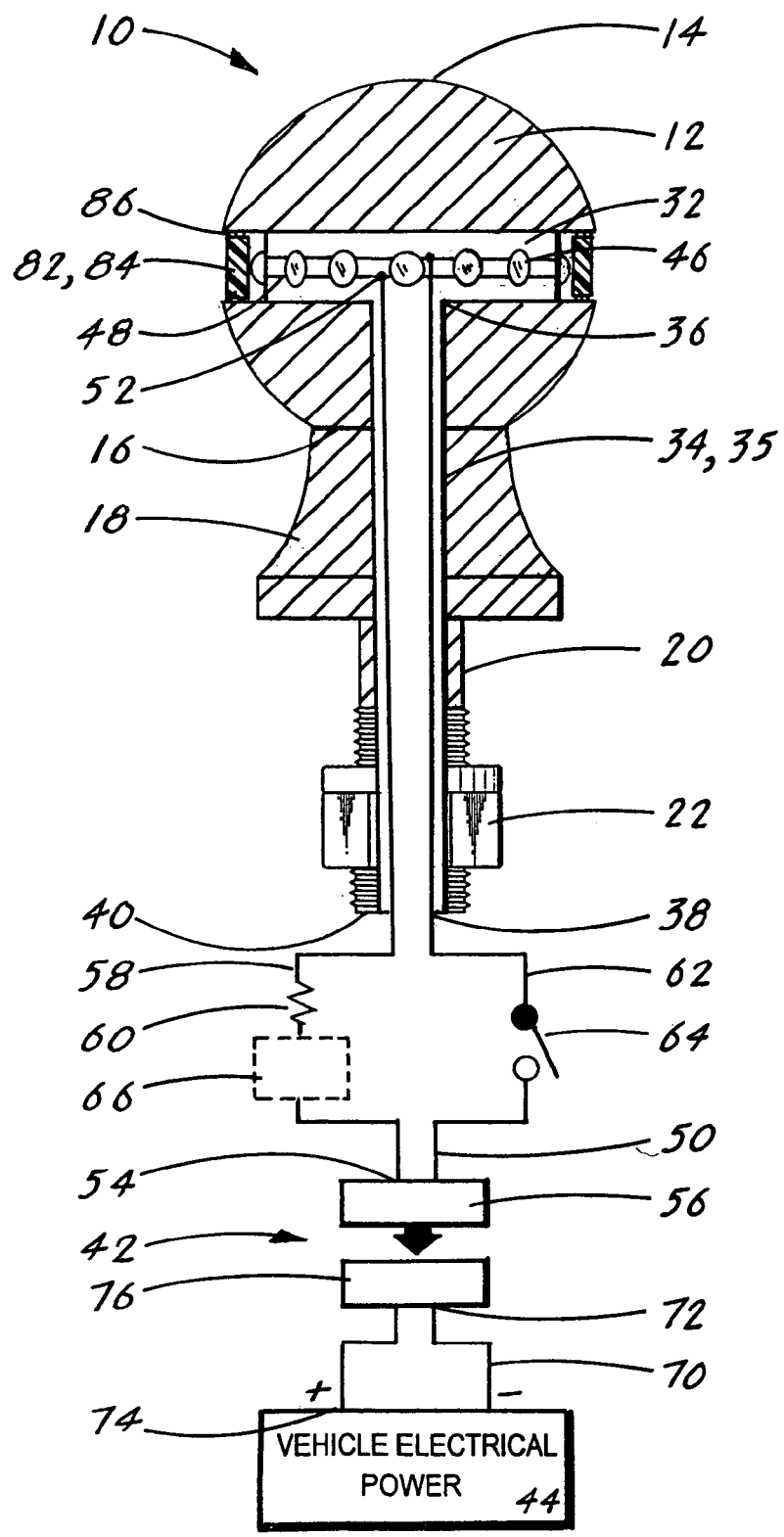
FIG. 2 is a front elevational, cross-sectional view of an embellished vehicle trailer hitch-ball assembly attached to a rear vehicle structure and having a substantially centered, horizontal LED channel that has attached a plurality of LEDs. This figure also shows a cable routing means consisting of a substantially centered wiring bore into which is inserted a first and a second cable assembly that are applied power from a vehicle electrical circuit.
Figure 4:
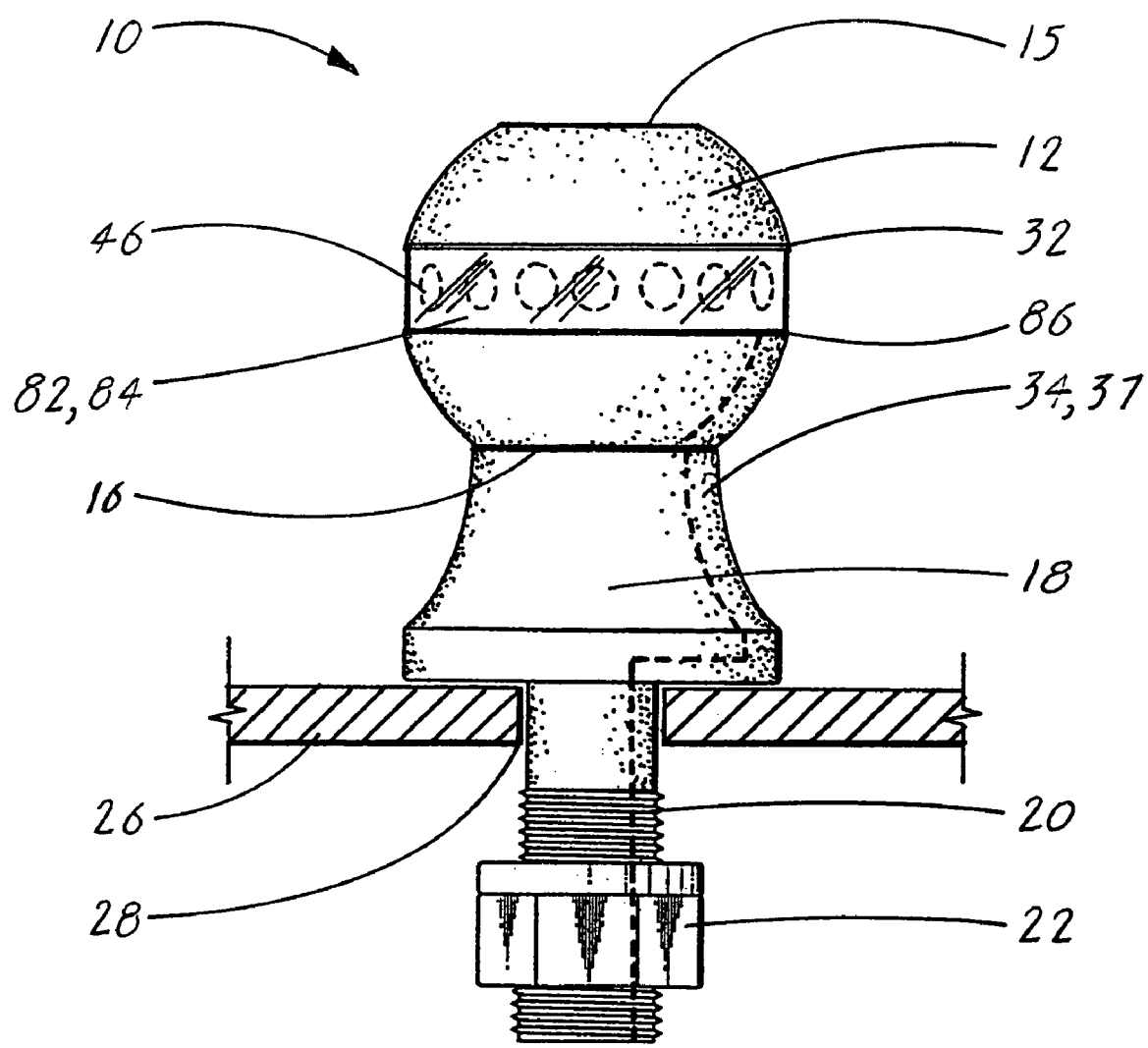
FIG. 4 is a front elevational view of the embellished vehicle trailer hitch-ball assembly having a vehicle hitch-ball with a truncated upper surface and a cable routing means consisting of a side wiring channel.

The first design configuration of the embellished vehicle trailer hitch-ball assembly 10, as shown in FIG. 2, is comprised of a vehicle trailer hitch-ball structure 11 that includes: an upper ball receptor 12 having an upper surface 14 and a lower surface 16. The upper surface 14 can be round, as shown in FIGS. 1 and 2, or can have a truncated upper surface 15, as shown in FIG. 4. The lower surface 16 is integrally attached to a vehicle frame-attachment platform 18 and is integrally followed by a threaded mounting rod 20 that is inserted into a frame bore 28 located on a rear vehicle frame 26. The vehicle trailer hitch-ball assembly 10 is subsequently tightened against the frame 26 by a mounting nut 22, as also shown in FIG. 2. The vehicle trailer hitch-ball structure 11 is modified by having a substantially centered LED channel 32 that is located on the upper ball receptor 12, a vertically-oriented cable routing means 34, and the addition of a hitch-ball electrical circuit 42.

Figure 3:
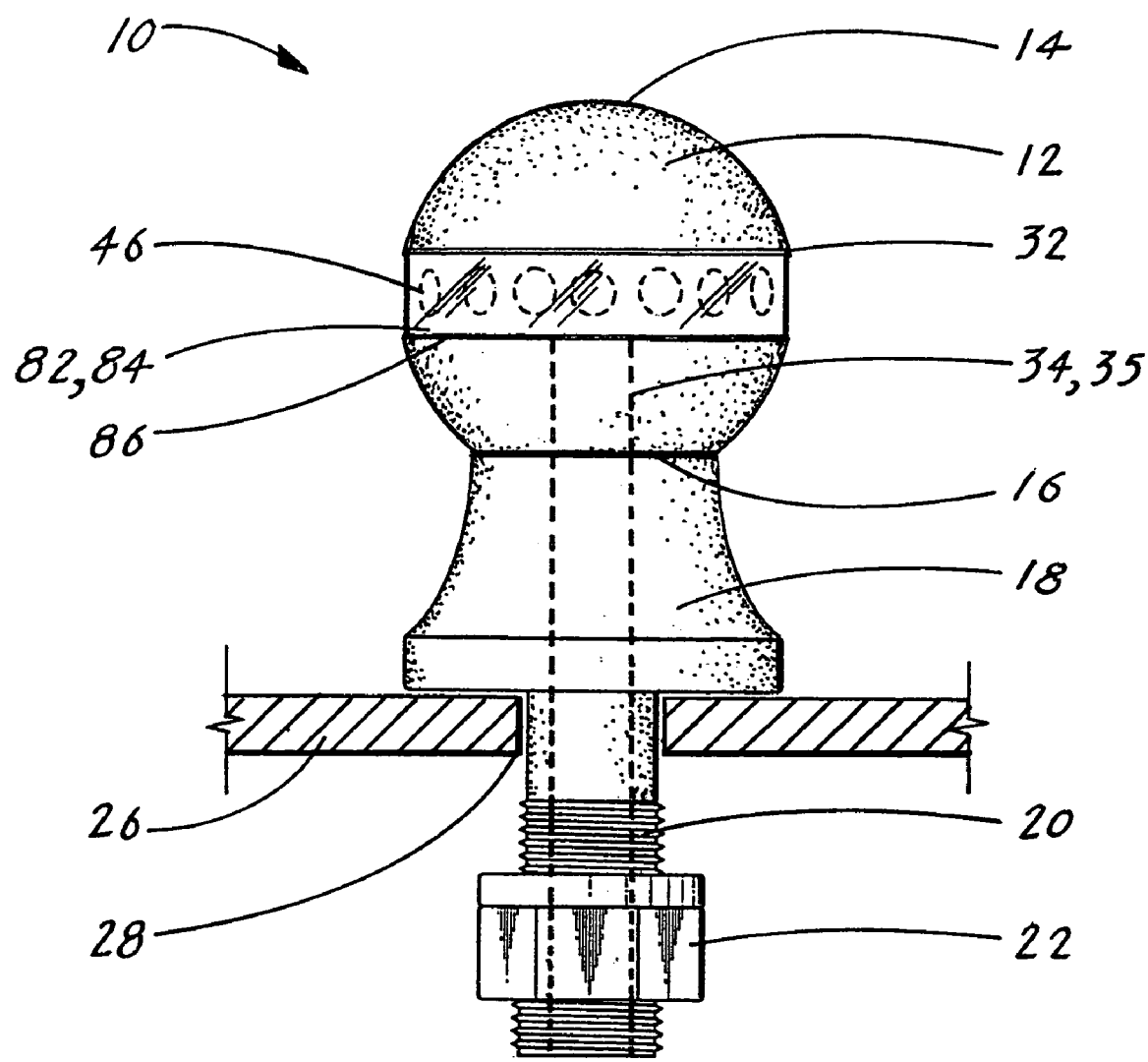
FIG. 3 is a front elevational view of an embellished vehicle trailer hitch-ball assembly attached to a rear vehicle structure and having a plurality of horizontally oriented LEDs and a vertical wiring bore.
Figure 5:
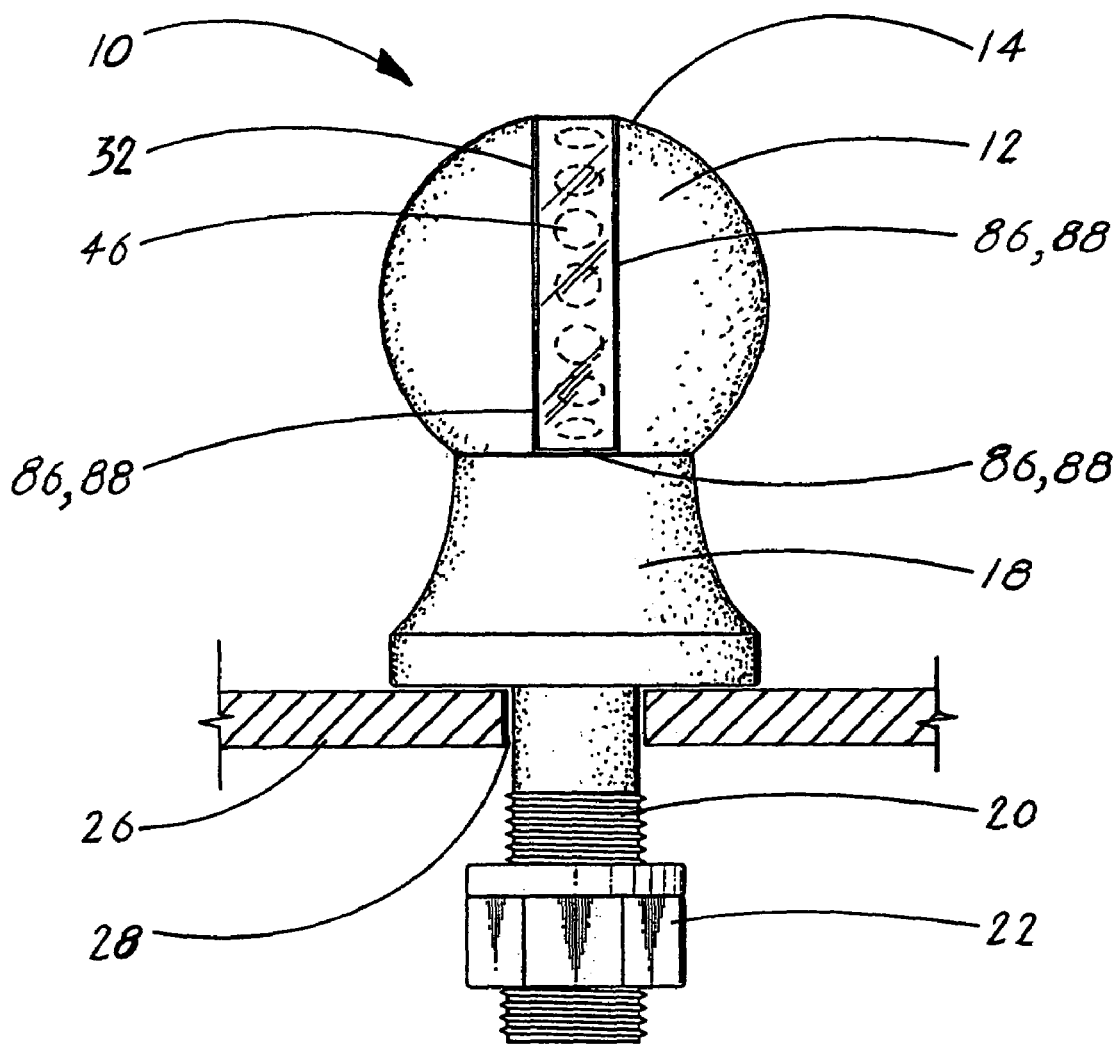
FIG. 5 is a front elevational view of an embellished vehicle trailer hitch-ball assembly attached to a rear vehicle structure and having a substantially centered, vertical LED channel that has a plurality of LEDs attached thereto.
Figure 7:
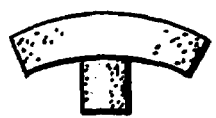
FIG. 7 is a front elevational view of a mast cavity cap that is inserted into a mast cavity that does not have a mast inserted.

The LED channel 32 can be horizontally oriented, as shown in FIGS. 2, 3 and 4, or vertically oriented, as shown in FIG. 5. The channel 32 is dimensioned to allow a plurality of LEDs 46 to be attached by an LED attachment means 48 around the circumference of the LED channel 32. After the LEDs 46 are attached, an LED cover 82 is attached by an attachment means 86 around the circumference of the horizontal LED channel 32. The LED cover 82 is comprised of a material selected from the group consisting of a translucent material, a transparent material and a reflective-translucent material. When the LED cover 82 is comprised of the reflective-translucent material and the LEDs 46 are turned on, the illumination from the LEDs is visible through the LED cover 82. Conversely, when the LEDs 46 are turned off, the outer reflective surface of the reflective-translucent material blends with the color of the upper ball receptor 12. With some material, the LED cover 82 can be made of a circular, resilient band 84 that hermetically fits into the LED channel 32.

When the LED channel 32 is vertically oriented, as shown in FIG. 5, the LED cover 82 is attached around the partial circumference of the LED channel 32 by the attachment means 86 that can consist of a waterproof adhesive 88 that is applied to the ends and between the interfacing surfaces of the LED cover 82 and the LED channel 32. Likewise, the adhesive 88 can also be applied to the LED cover 82 that is placed around the horizontally oriented LED channel 32.

The ball receptor 12 is further modified by a vertically oriented cable mounting means 34, which has an upper edge 36 that intersects the LED channel 32 and a lower edge 38 that extends through the terminus 40 of the threaded mounting rod 20. The cable routing means 34 can consist of a substantially centered, vertical wiring bore 35, as shown in FIGS. 2 and 3, or can be comprised of side wiring channel 37, as shown by the broken lines in FIG. 4. When the wiring channel 37 is used, the wires routed through the channel 37 are secured and protected from the elements by the application of a water-proof compound.

The hitch-ball electrical circuit 42, as also shown in FIG. 2, includes the plurality of LEDs 46, which are connected in parallel and that are attached by the LED attachment means 48 around the circumference of the horizontally oriented LED channel 32 or around the partial circumference of the vertically oriented LED channel 32, as shown in FIG. 5. The hitch-ball electrical circuit 42 is operated by a cable assembly consisting of a first cable assembly 50 and a second cable assembly 70.

The first cable assembly 50 has a first end 52, a second end 54, a first wire 58 and a second wire 62. The cable assembly 50 is inserted into the vertically oriented cable routing means 34, which can consist of the vertical wiring bore 35, as shown in FIGS. 2 and 3, or the side wiring channel 32, as shown in FIG. 4. The first end 52 of the first cable assembly 50 is electrically connected to an input of the parallel connected LEDs 46. The second end 54 projects through the lower edge 38 of the cable routing means 34 and is electrically connected to an electrical plug 56, as shown in FIG. 2.

As also shown in FIG. 2, between the first end 52 of the first cable assembly 50 and the electrical plug 56 is connected, in series with the first wire 58, a voltage dropping resistor 60 that drops the voltage to an acceptable level thus allowing the LEDs 46 to illuminate. Connected in series with the second wire 62 is a power switch 64 that when turned-on allows electrical power to be applied to the LEDs 46. Optionally, as also shown in FIG. 2, a light blinking circuit 66 can be connected in series with the first wire 58 or the second wire 62.

The second cable assembly 70 includes a first end 72 and a second end 74. The first end 72 is connected to an electrical receptacle 76 that is designed to interface with the electrical plug 56. The second end 74 is connected to a 12-volt vehicle electrical circuit 44. The circuit 44 can be selected from the group consisting of a vehicle switched voltage, a vehicle non-switched voltage, and a voltage applied when the vehicle brake pedal is depressed. Note that when the circuit 44 is connected to the power provided by the brake pedal, the assembly 10 functions as a fourth brake light.

Figure 8:
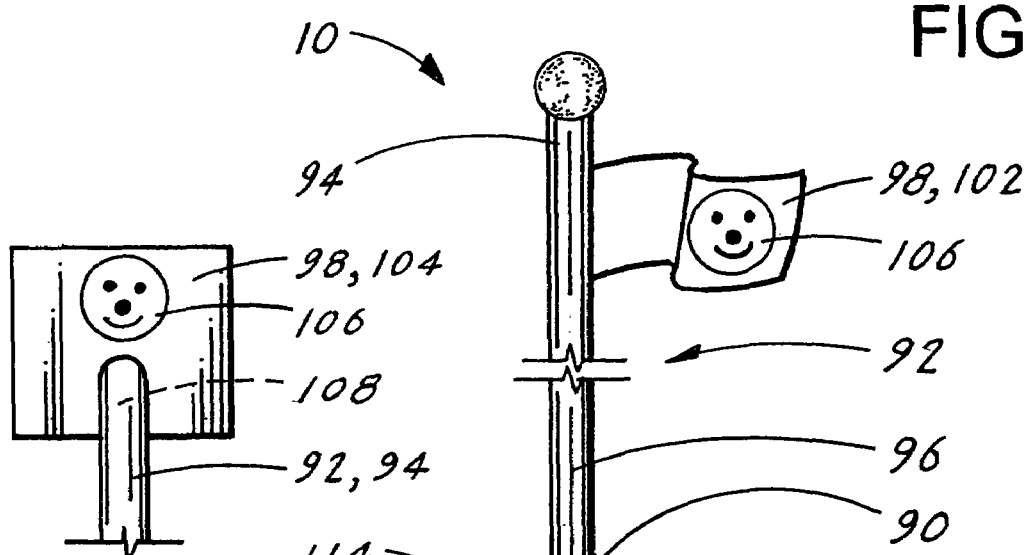
FIG. 8 is a front elevational view of a mast with an upper section having a slot into which is inserted and held a placard.
Figure 6:
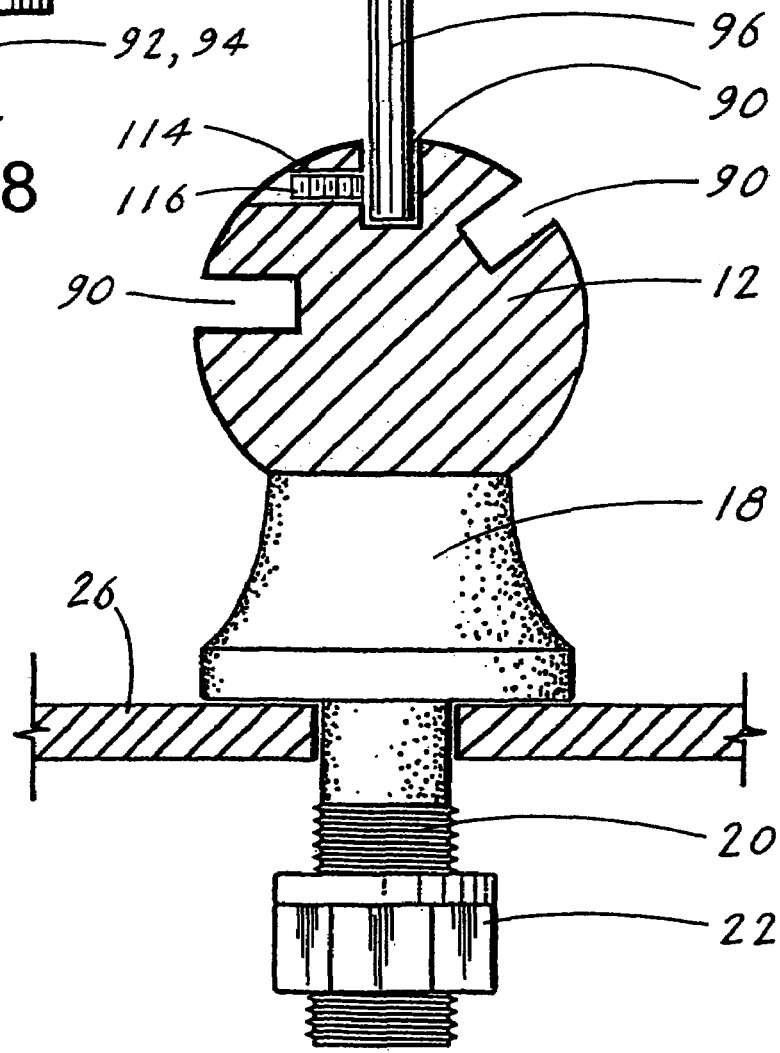
FIG. 6 is a front elevational, cross-sectional view of an embellished vehicle trailer hitch-ball assembly that includes a plurality of mast cavities into which can be inserted a mast that has a display such as a flag, a pennant, a banner or a placard attached thereto.

The second design configuration of the embellished vehicle trailer hitch-ball assembly 10, as shown in FIG. 6, is comprised of an upper ball receptor 12 that has at least one mast cavity 90 that can be positioned horizontally, vertically or at an angle. Into the mast cavity 90 is inserted a lower section 94 of a mast 92, which has an upper section 96 that has attached thereto a display 98. The display 98 can be selected from the group consisting of a flag or pennant 102, and a placard 104. The flag or pennant 102 is shown attached to the mast 92 in FIG. 6, and a placard is shown attached to the mast 92, in FIG. 8. The flag, pennant or placard can include indicia 106, as shown in FIGS. 6 and 8. To attach the placard 104, the mast 92 can include a retaining slot 108 that is dimensioned to frictionally retain the placard 104, as shown in FIG. 8. Additionally, a mast cavity cap 110 can be frictionally inserted into any of the mast cavities 90 that does not have a mast 92 inserted. To assure that the mast 92 is secured to the mast cavity 90, a mast securing means 112, as shown in FIG. 6, can be utilized. The securing means 112 consists of set-screw threaded bore 114 into which is threaded a set-screw 116 that impinges against and holds the mast 92 in place.

Figure 9:
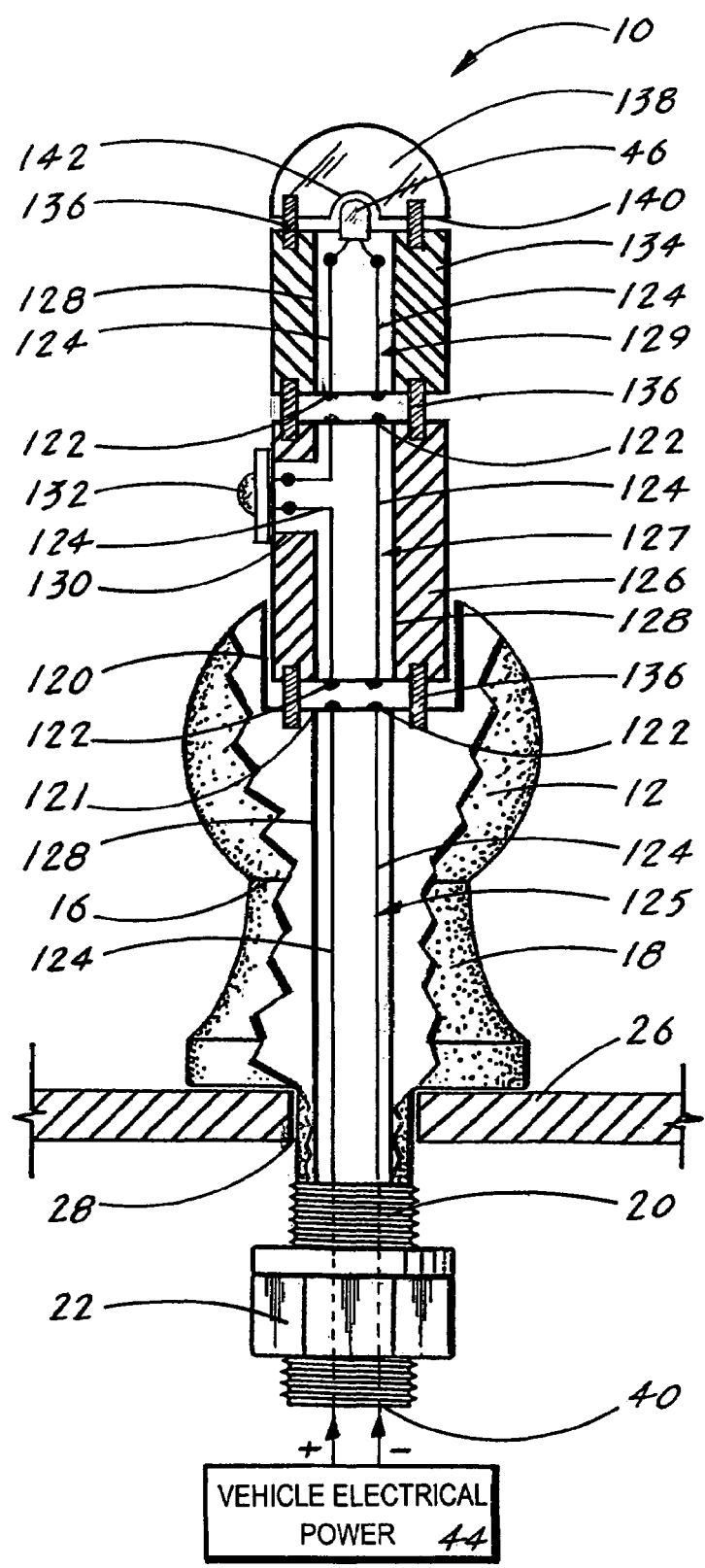
FIG. 9 is a front elevation, cross-sectional view of an embellished vehicle trailer hitch-ball having a module cavity dimensioned to retain a first module which in-turn retains a second module having a translucent or transparent dome attached thereto. The first module is connected to a switch controlled vehicle electrical circuit that supplies power to an LED that is attached between the second module and the translucent or transparent dome.

The third and final design configuration of the embellished vehicle trailer hitch-ball assembly 10, as shown in FIG. 9, is comprised of a vehicle trailer hitch-ball structure 11 that includes an upper ball receptor 12 having an upper surface 14 and a lower surface 16. The lower surface 16 is integrally attached to the frame-attachment platform 18 that is integrally followed by a threaded mounting rod 20 that is inserted into a frame bore 28 located on a rear vehicle frame 26. The embellished vehicle trailer hitch-ball assembly 10 is tightened against the frame 26 by means of a mounting nut 22.

The vehicle trailer hitch-ball structure 11 is modified by cutting into the upper surface 14 of the upper ball receptor 12, as shown in FIG. 9, a substantially centered module cavity 120, which has a substantially centered cavity bore 121. Additionally, the structure 11 includes a substantially centered, three-section wiring bore 128, an electrical circuit consisting of a first module 126, a second module 134, a three-section two-wire cable 124, and a dome 138.

The substantially centered wiring bore 128 has an upper edge that is in alignment with the cavity bore 121 on the module cavity 120, and a lower edge that terminates at the terminus 40 of the threaded mounting rod 22. The first module 126 is dimensioned to fit into the module cavity 120, has means 136 for being removably attached to the module cavity 120, and has a wiring bore 128 that is in alignment with the wiring bore 128 on the module cavity 120. The second module 134 is dimensioned to be removably attached to the first module 126 by the attachment means 136, and has a wiring bore 128 that is in alignment with the wiring bore 128 on the first module 126.

The three-section two-wire cable 124 is comprised of a first cable section 125, a second cable section 127 and a third cable section 129, with each cable section having a lower end and an upper end.

The lower end of the first cable section 125 extends through the terminus 40 of the threaded mounting rod 20 and is connected to a vehicle electrical circuit 44. The circuit 44 is selected from the group consisting of a vehicle switched voltage, a vehicle non-switched voltage, and a voltage applied when the vehicle brake pedal is depressed. The upper end of the first cable section 125 includes a pair of electrical contacts 122 and terminates at the cavity bore 121 located at the base of the module cavity 120.

The second cable section 127 has a lower end having a pair of electrical contacts 122 that make electrical contact with a pair of electrical contacts 122 located on the upper end of the first cable section 125 when the second module 134 is inserted into the module cavity 120. The upper end of the second cable 127 terminates with a pair of electrical contacts 122 at an upper surface of the first module 126. The second cable 127 further has an opening in one of the wires that has a power switch 132 attached in series. The power switch 132 protrudes through a switch bore 130 located on the side of the second module 134, as shown in FIG. 9.

The third cable section 129 has a lower end that makes electrical contact with the upper end of the second cable section 127 when the second module 134 is attached to the first module 126. The upper end of the third cable section 129 is electrically connected to at least one LED 46 that extends upward from the upper surface of the second module 134. When the power switch 132 is depressed, power from the vehicle electrical circuit 44 is applied to and illuminates the at least one LED 46.

The final element of the electrical circuit is a translucent or transparent dome 138. The dome 138 has a lower surface 140 which has an LED cavity 142 that is dimensioned to fit over the at least one LED 46, and means 136 for being removably attached to the second module 134.

While the invention has been described in detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

PARTS LIST

| | |
|---|---|
| 10 | Embellished Vehicle Trailer Hitch-Ball Assembly |
| 11 | Vehicle Trailer Hitch-Ball Structure |
| 12 | Upper Ball Receptor |
| 14 | Upper Surface |
| 15 | Truncated Surface |
| 16 | Lower Surface |
| 18 | Frame Attachment Platform |
| 20 | Threaded Mounting Rod |
| 22 | Mounting Nut |
| 24 | |
| 26 | Rear Vehicle Frame |
| 28 | Frame Bore |
| 30 | |
| 32 | LED Channel |
| 34 | Vertically Oriented Cable Routing Means |
| 35 | Wiring Bore |
| 36 | Upper Edge |
| 37 | Wiring Channel |
| 38 | Lower Edge |
| 40 | Mounting Rod Terminus |
| 42 | Hitch-Ball Electrical Circuit |
| 44 | Vehicle Electrical Circuit |
| 46 | LED |
| 48 | LED Attachment Means |
| 50 | First Cable Assembly |
| 52 | First End |
| 54 | Second End |
| 56 | Electrical Plug |
| 58 | First Wire |
| 60 | Resistor |
| 62 | Second Wire |
| 64 | Power Switch |
| 66 | Light Blinking Circuit |
| 68 | |
| 70 | Second Cable Assembly |
| 72 | First End |
| 74 | Second End |
| 76 | Electrical Receptacle |
| 78 | |
| 80 | |
| 82 | LED Cover |
| 84 | Resilient Band |
| 86 | Attachment Means |
| 88 | Adhesive |
| 90 | Mast Cavity |
| 92 | Mast |
| 94 | Lower Section |
| 96 | Upper Section |
| 98 | Display |
| 100 | |
| 102 | Flag or Pennant |
| 104 | Placard |
| 106 | Indicia |
| 108 | Placard Retaining Slot |
| 110 | Mast Cavity Cap |
| 112 | Mast Securing Means |
| 114 | Set-Screw Threaded Bore |
| 116 | Set Screw |
| 118 | |
| 120 | Module Cavity |
| 121 | Cavity Bore |
| 122 | Electrical Contact |
| 124 | Three-Section, Two-Wire Cable |
| 125 | First Cable Section |
| 126 | First Module |
| 127 | Second Cable Section |
| 128 | Wiring Bore |
| 129 | Third Cable Section |
| 130 | Switch Bore |
| 132 | Power Switch |
| 134 | Second Module |
| 136 | Attachment Means |
| 138 | Translucent Dome |
| 140 | Lower Surface |
| 142 | LED Cavity |

The invention claimed is:

1. An embellished vehicle trailer hitch-ball assembly comprising:
   a) a vehicle trailer hitch-ball structure comprising an upper ball receptor having an upper surface and a lower surface, wherein the lower surface is integrally attached to a vehicle frame-attachment platform, and is integrally followed by a threaded mounting rod, and wherein the rod is inserted into a frame bore located on a rear vehicle frame and is subsequently tightened by a mounting nut, said vehicle trailer hitch-ball structure further having:
      (1) a substantially centered LED channel located on the upper ball receptor, and
      (2) a vertically oriented, cable routing means having an upper edge that intersects the LED channel and a lower edge that extends through the terminus of the threaded mounting rod,
   b) a hitch-ball electrical circuit comprising:
      (1) a plurality of parallel connected LED's that are attached by an attachment means around the circumference of said LED channel,
      (2) a first cable assembly having a first end, a second end, a first wire and a second wire, wherein said first cable assembly is inserted into said cable routing means, with the first end of said first cable assembly electrically connected to an input of said parallel connected LED's, and the second end of said first cable assembly projects through the lower edge of said cable routing means and is electrically connected to an electrical plug, and wherein between the first end of said first cable assembly and the electrical plug is connected in series with the first wire a voltage dropping resistor, and connected in series with the second wire is a power switch, and
      (3) a second cable assembly having a first end connected to an electrical receptacle designed to interface with the electrical plug, and a second end that is connected to a 12-volt vehicle electrical circuit.

2. The embellished vehicle hitch-ball assembly as specified in claim 1 wherein said first cable assembly further comprises a light blinking circuit that is connected in series with the first wire or the second wire of said first cable assembly.

3. The embellished vehicle trailer hitch-ball assembly as specified in claim 1 wherein said 12-volt vehicle electrical circuit is selected from the group consisting of a vehicle switched voltage, a vehicle non-switched voltage, and a voltage applied when the vehicle brake pedal is depressed.

4. The embellished vehicle trailer hitch-ball assembly as specified in claim 1 wherein said substantially centered LED channel is horizontally oriented.

5. The embellished vehicle trailer hitch-ball assembly as specified in claim 4 further comprising an LED cover that is attached by an attachment means around the circumference of said horizontal LED channel, wherein said LED cover is comprised of a material selected from the group consisting of a translucent material, or transparent material, and a reflective-translucent material.

6. The embellished vehicle trailer hitch-ball assembly as specified in claim 5 wherein said LED cover consists of a circular, resilient band that hermetically fits into said LED channel.

7. The embellished vehicle trailer hitch-ball assembly as specified in claim 1 wherein said substantially centered LED channel is vertically oriented.

8. The embellished vehicle trailer hitch-ball assembly as specified in claim 7 further comprising an LED cover that is attached by an attachment means around the partial circumference of said vertical LED channel.

9. The embellished vehicle trailer hitch-ball assembly as specified in claim 8 wherein said means for attaching said LED cover further comprises a waterproof adhesive that is applied to the ends and between the interfacing surfaces of said LED cover and said LED channel.

10. The embellished vehicle trailer hitch-ball assembly as specified in claim 1 wherein the upper surface of said upper ball receptor is further comprised of a truncated surface.

11. The embellished vehicle trailer hitch-ball assembly as specified in claim 1 wherein said cable routing means is comprised of a substantially centered, vertical wiring bore.

12. The embellished vehicle trailer hitch-ball assembly as specified in claim 1 wherein said cable routing means is comprised of a side wiring channel.

13. The embellished vehicle trailer hitch-ball assembly as specified in claim 1 wherein said assembly is comprised of a material selected from the group consisting of polished steel, chrome-plated steel, and plastic.

* * * * *